United States Patent [19]

Fujimoto

[11] Patent Number: 5,837,895
[45] Date of Patent: Nov. 17, 1998

[54] VIBRATING GYROSCOPE INCLUDING A PIEZOELECTRIC SUBSTRATE POLARIZED BY A POLARIZATION INVERSION PHENOMENON

[75] Inventor: Katsumi Fujimoto, Toyama-ken, Japan

[73] Assignee: Murata Manufacturing Co., Ltd., Japan

[21] Appl. No.: 670,346

[22] Filed: Jun. 25, 1996

[30] Foreign Application Priority Data

Jun. 27, 1995 [JP] Japan .................................. 7-161096

[51] Int. Cl.$^6$ .................................................. G01P 9/04
[52] U.S. Cl. ............................ 73/504.12; 73/504.02
[58] Field of Search ........................... 73/504.12, 504.13, 73/504.14, 504.15; 310/316, 321

[56] References Cited

U.S. PATENT DOCUMENTS

| | | | |
|---|---|---|---|
| 3,258,617 | 6/1966 | Hart ...................................... | 73/504.12 |
| 3,520,195 | 7/1970 | Tehon ................................... | 73/504.14 |
| 4,431,935 | 2/1984 | Rider .................................... | 73/504.13 |
| 5,270,607 | 12/1993 | Terajima ................................ | 310/316 |
| 5,349,857 | 9/1994 | Kasanami et al. .................... | 73/504.12 |
| 5,430,342 | 7/1995 | Watson ................................. | 310/316 |
| 5,434,467 | 7/1995 | Abe et al. ............................. | 310/316 |
| 5,495,759 | 3/1996 | Nakamura et al. ................... | 73/504.12 |
| 5,495,760 | 3/1996 | Wirt ..................................... | 73/504.13 |

OTHER PUBLICATIONS

H. Ahlfeldt, "Single–Domain Layers Formed In Heat–Treated LiTaO$_3$", Appl. Phys. Lett. 64 (24), pp. 3213–3215, Jun. 13, 1994.
L. Huang et al., "Discussion of Domain Inversion LiNbO$_3$", Appl. Phys. Lett. 65 (14), pp. 1763–1765, Oct. 3, 1994.
V.D. Kugel et al., "Domain Inversion In Heat–Treated LiNbO$_3$ Crystals", Appl. Phys. Lett. 62 (23), pp. 2902–2904, Jun. 7. 1993.
K. Nakamura et al., "Ferroelectric Domain Inversion Caused In LiNbO$_3$ Plates By Heat Treatment", Appl. Phys. Lett. 50 (20), pp. 1413–1414, May 18, 1987.
K. Nakamura et al., "Ferroelectric Inversion Layers Formed By Heat Treatment of Proton Exchanged LiTaO$_3$", Appl. Phys. Lett. 56 (16), pp. 1535–1536, Apr. 16, 1990.
K. Nakamura et al., "Bending Vibrator Consisting of a LiNbO$_3$ Plate With a Ferroelectric Inversion Layer", Japanese Journal of Applied Physics, vol. 26 (1987), Supplement 26–2, pp. 198–200.
K. Nakamura et al., "Estimation of Thickness of Ferroelectric Inversion Layers in LiTaO$_3$ Plates by Measuring Piezoelectric Responses", Japanese Journal of Applied Physics, vol. 29 (1990), Supplement 29–1, pp. 95–97.
K. Nakamura et al, "Hystresis–Free Piezoelectric Actuators Using LiNbO$_3$ Plates With a Ferroelectric Inversion Layer", Ferroelectrics, 1989, vol. 96, pp. 211–216.
V.D. Kugel et al., "Ferroelectric Domain Switching In Heat–Treated LiNbO$_3$ Crystals", Ferroelectrics Letters, 1993, vol. 15, pp. 55–60.

*Primary Examiner*—Christine K. Oda
*Attorney, Agent, or Firm*—Ostrolenk, Faber, Gerb & Soffen, LLP

[57] ABSTRACT

A vibrating gyroscope includes a piezoelectric substrate polarized oppositely in the thickness direction. Two divided electrodes are provided at one main surface of the piezoelectric substrate and a common electrode is provided at the other main surface of the piezoelectric substrate. An oscillation circuit applies a drive signal between the two divided electrodes and the common electrode to vibrate the single piezoelectric substrate under a bending mode and a differential amplifier circuit detects a signal generated between the two divided electrodes.

13 Claims, 4 Drawing Sheets

VIBRATING GYROSCOPE INCLUDING A PIEZOELECTRIC SUBSTRATE POLARIZED BY A POLARIZATION INVERSION PHENOMENON

BACKGROUND OF THE INVENTION

1. Field of the Invention

The present invention relates to vibrating gyroscopes, and more particularly, to a vibrating gyroscope which can be used for a navigation system that gives an appropriate guidance by detecting a rotational angular velocity to detect the position of a moving object, or used for an anti-vibration system such as a camera-shake prevention apparatus that prevents the adverse effects of shaking by detecting a rotational angular velocity due to external vibration, such as camera shake.

2. Description of the Related Art

FIG. 8 is a diagram showing an example of a conventional vibrating gyroscope 1 which includes a vibrator 2.

The vibrator 2 includes a Ni-alloy vibrating member 3 having a regular triangular prism shape. At substantially the centers of the three side faces of the vibrating member 3, three piezoelectric elements 4a, 4b, and 4c are formed, respectively. The piezoelectric element 4c of the vibrator 2 is connected to the input terminal of an oscillation circuit 5 serving as drive means. The output terminal of this oscillation circuit 5 is connected to one end of each of two resistors 6a and 6b. The other ends of these resistors 6a and 6b are connected to two piezoelectric element 4a and 4b, respectively. The piezoelectric elements 4a and 4b are also connected to the non-inverted-input terminal (+) and the inverted-input terminal (−) of a differential amplifier circuit 7 serving as detection means through resistors 8a and 8b, respectively. Between the output terminal and the inverted-input terminal (−) of the differential amplifier circuit 7, a resistor 8c is connected.

In the vibrator 2, when the same drive signal is applied to two piezoelectric elements 4a and 4b, for example, the vibrating member 3 vibrates under a bending mode in the direction perpendicular to the main surface of the piezoelectric element 4c. When the vibrator 2 is not rotated, the same detection signal is obtained from the piezoelectric elements 4a and 4b. When the angular velocity caused by rotation about the center axis of the vibrating member 3 is applied to the vibrator 2, the direction of vibration of the vibrating member 3 changes due to the Coriolis force. Detection signals according to the rotation angular velocity are obtained from the two piezoelectric elements 4a and 4b, respectively. In this case, for example, in response to the rotation angular velocity, the voltage of the detection signal from one piezoelectric element, 4a, becomes large and the voltage of the detection signal from the other piezoelectric element, 4b, becomes small.

Therefore, the vibrating gyroscope 1 can detect a rotation angular velocity applied to the vibrator 2 from the output signal of the differential amplifier circuit 7.

The conventional vibrating gyroscope 1 has the following drawbacks. Specifically, since a Ni alloy is used for the vibrating member 3 of the vibrator 2 in this vibrating gyroscope 1, the detected signal is prone to disturbance due to the influence of a magnetic field. Also, since Ni is expensive, the cost is high. In addition, because the vibrating member 3 is usually adhered to the piezoelectric elements 4 with the use of adhesives, such as epoxy resin, the adhesion has low heat-resistance. Further, since a ceramic member used for the piezoelectric elements 4 itself has a Curie point of about 300° C., the piezoelectric elements 4 deteriorates even if electrodes are soldered at about 230° C., changing the performance before and after the soldering.

SUMMARY OF THE INVENTION

It is therefore an object of the present invention to provide a less-expensive, highly heat-resistant vibrating gyroscope in which the detected signal is not susceptible to the influence of a magnetic field.

The foregoing object is achieved through the provision of a vibrating gyroscope having a piezoelectric substrate polarized oppositely in the thickness direction, two divided electrodes formed at one main surface of the piezoelectric substrate, a common electrode formed at the other main surface of the piezoelectric substrate, drive means for applying a drive signal between the two divided electrodes and the common electrode, and detection means for detecting a signal generated between the two divided electrodes. The piezoelectric substrate preferably comprises a single crystal plate which is made of $LiNbO_3$ or $LiTaO_3$ and polarized by utilizing a polarization inversion phenomenon due to the pyroelectric effect.

According to the present invention, since expensive metal materials such as a Ni alloy are not used, the cost can be reduced. The detected signal is not prone to get disturbed since it is not susceptible to the influence of a magnetic field. In addition, since an adhesion surface does not exist between metal materials and the piezoelectric elements, and single crystal plates generating a polarization inversion phenomenon due to the pyroelectric effect, such as a $LiNbO_3$ single crystal plate and a $LiTaO_3$ single crystal plate, have high Curie points, a highly heat-proof vibrating gyroscope is obtained.

For the purpose of illustrating the invention, there is shown in the drawings several forms which are presently preferred, it being understood, however, that the invention is not limited to the precise arrangements and instrumentalities shown.

DETAILED DESCRIPTION OF PREFERRED EMBODIMENTS

Figure 1:
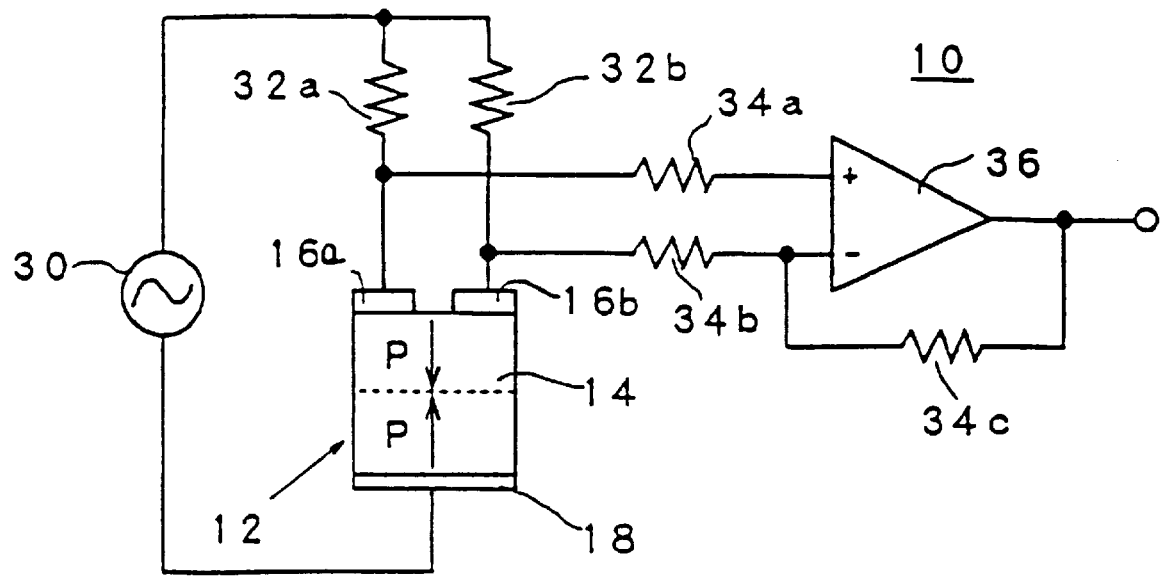
FIG. 1 is a diagram showing a vibrating gyroscope according to an embodiment of the present invention.

An embodiment of a vibrating gyroscope according to the present invention will be described below by referring to the drawings. FIG. 1 is a diagram showing an embodiment of a vibrating gyroscope 10 of the present invention which includes a vibrator 12.

Figure 2:
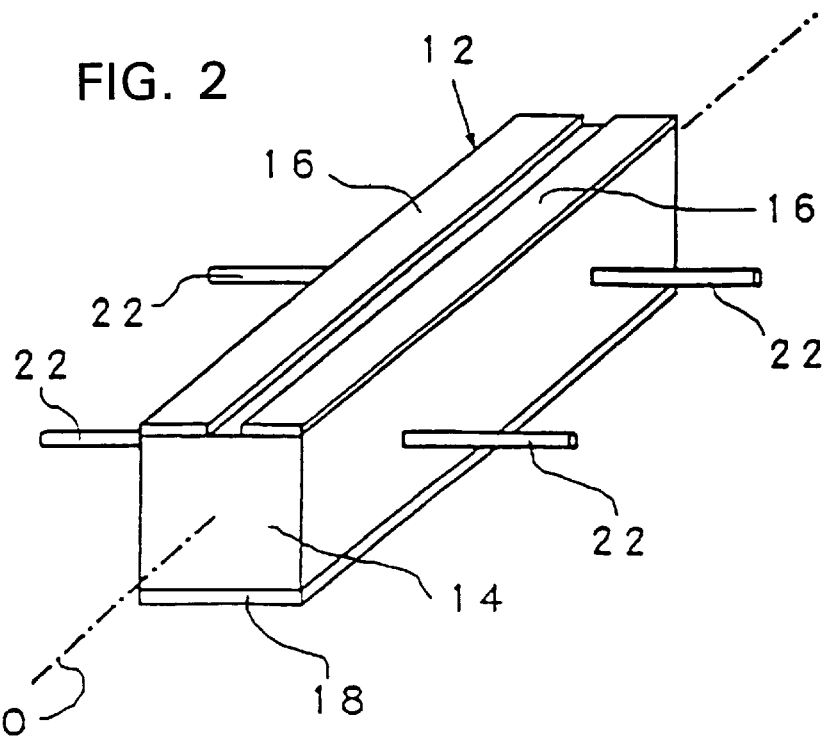
FIG. 2 is a perspective view of a vibrator used for the vibrating gyroscope shown in FIG. 1.

The vibrator 12 includes a piezoelectric substrate 14 which may, for example, be in a square-prism-shape as shown in FIG. 2. As the piezoelectric substrate 14, a single crystal plate generating a polarization inversion phenomenon due to the pyroelectric effect, such as a $LiNbO_3$ single crystal plate and a $LiTaO_3$ single crystal plate, is used. The piezoelectric substrate 14 is a single layer but includes an upper section and lower section. The upper section is polarized toward the lower section, while the lower section is polarized toward the upper section. Thus, the piezoelectric substrate 14 as a whole is polarized such that polarization directions of the upper and lower sections oppose each other in the vicinity of the center in the thickness direction of the piezoelectric substrate 14 as shown by the arrows P in FIG. 1.

The piezoelectric substrate 14 is polarized with the use of a local polarization inversion phenomenon due to heat, which is a feature of the single crystal plate used in this invention. For example, a layer in which spontaneous polarization is inverted (hereinafter called a "polarization inversion layer") is formed in a $LiNbO_3$ single crystal plate when the plate is subject to heat treatment at a temperature slightly lower than the Curie point of the plate. When other single crystal plates which generate a polarization inversion phenomenon due to the pyroelectric effect are used, a polarization inversion layer is formed as in the $LiNbO_3$ single crystal plate.

At one main surface of the piezoelectric substrate 14, two divided electrodes 16a and 16b are formed with a clearance in the width direction of the piezoelectric substrate 14. At the other main surface of the piezoelectric substrate 14, a common electrode 18 is formed. Since the vibrator 12 is polarized such that polarization directions of the upper and lower portions oppose each other in the vicinity of the center in the thickness direction of the piezoelectric substrate 14, when a drive signal, such as a sine-wave signal, is applied between the two divided electrodes 16a and 16b, and the common electrode 18, the piezoelectric substrate 14 vibrates reversely with a boundary at the center.

More particularly, when the upper portion in the vicinity of the center in the longitudinal direction of the piezoelectric substrate 14 extends away from the center in the thickness direction in the direction perpendicular to one main surface, the lower portion in the vicinity of the center in the longitudinal direction of the piezoelectric substrate 14 contracts toward the center in the thickness direction in the direction perpendicular to the other main surface. This results in the deformation of the piezoelectric substrate 14 as shown by a dotted line 50 in FIG. 3.

In contrast, when the upper portion in the vicinity of the center in the longitudinal direction of the piezoelectric substrate 14 contracts away from the center in the thickness direction in the direction perpendicular to one main surface, the lower portion in the vicinity of the center in the longitudinal direction of the piezoelectric substrate 14 extends away from the center in the thickness direction in the direction perpendicular to the other main surface. This results in the deformation of the piezoelectric substrate 14 as shown by a dotted line 51 in FIG. 3.

Figure 3:
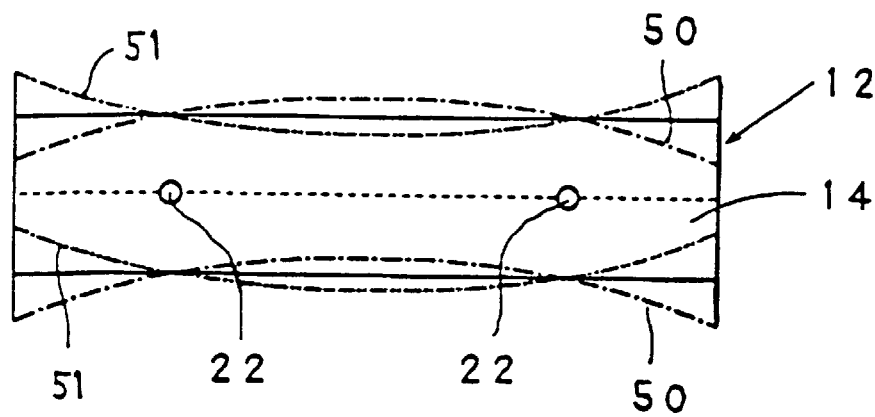
FIG. 3 is a side view illustrating states of bending vibration of the vibrator shown in FIG. 2.

Therefore, the piezoelectric substrate 14 vibrates under a bending mode in the direction perpendicular to both main surfaces with points slightly inner from both ends in the longitudinal direction serving as nodes, as shown in FIG. 3.

For this reason, in the vicinity of the nodes of the vibrator 12, line-shaped support members 22 are mounted respectively such that the support members 22 are inserted at the boundary between the upper and lower portions of the piezoelectric substrate 14 along the width direction, as shown in FIG. 2. The vibrator 12 is supported by these support members 22. Even when the support members 22 are mounted in the vicinities of the nodes on one main surface or the other main surface of the vibrator 12, the vibrator 12 can be supported without giving a large influence to the vibration.

To apply a drive signal such as that described above to the vibrator 12, one output terminal of an oscillation circuit 30 serving as drive means is connected to the two divided electrodes 16a and 16b of the vibrator 12 through resistors 32a and 32b as shown in FIG. 1. The other output terminal of the oscillation circuit 30 is connected to the common electrode 18 of the vibrator 12.

The two divided electrodes 16a and 16b of the vibrator 12 are also connected to the non-inverted-input terminal (+) and the inverted-input terminal (−) of a differential amplifier circuit 36 serving as detection means through resistors 34a and 34b, respectively. Between the output terminal and the inverted-input terminal (−) of the differential amplifier circuit 36, a resistor 34c is connected.

Figure 4A:
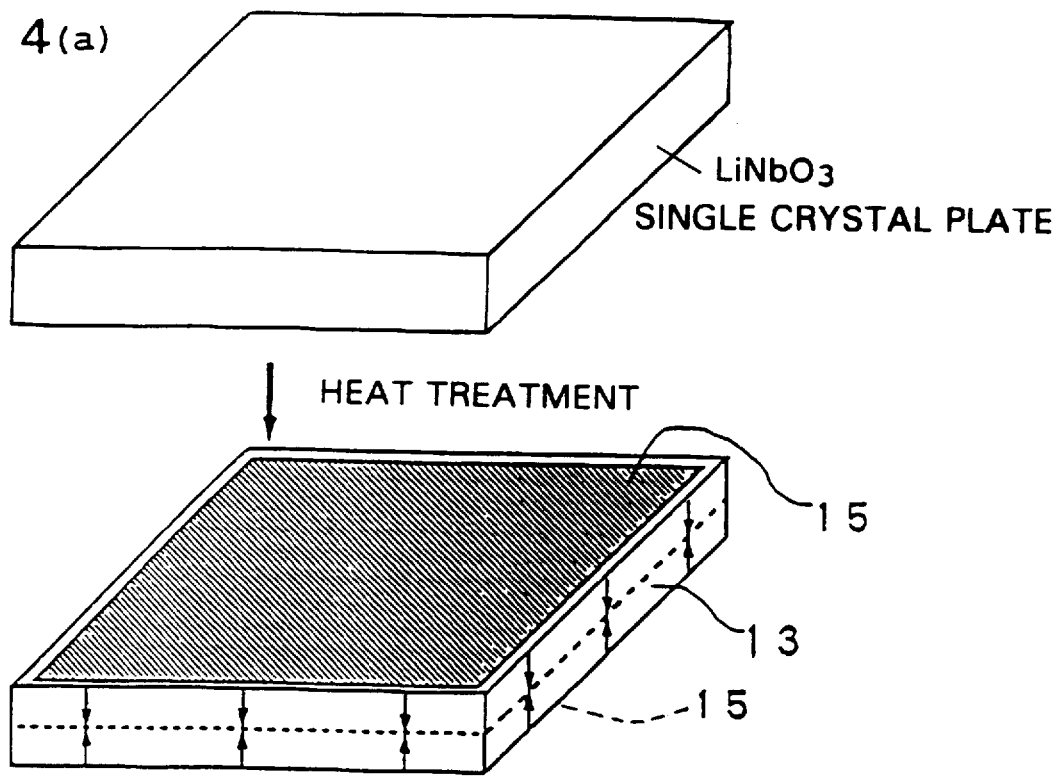
FIG. 4(a) to (c) are views showing a manufacturing method of the vibrator shown in FIG. 2.

A manufacturing method of the vibrator 12 used for the vibrating gyroscope 10 configured as described above will be described by referring to FIG. 4(a) to 4(c). As shown in FIG. 4(a), a $LiNbO_3$ single crystal plate which is uniformly polarized in one direction, for example upward, is subject to heat treatment at a temperature slightly lower than the Curie point of the $LiNbO_3$ single crystal plate, for example, about 1100° C. to form a polarization inversion layer due to the pyroelectric effect in the upper section of the $LiNbO_3$ single crystal plate. The polarization inversion layer is so formed by sufficient heat treatment that the polarization inversion layer has substantially a half of the thickness of the $LiNbO_3$ single crystal plate. Thus, the piezoelectric substrate 13 polarized oppositely with respect to the upper half portion and lower half portion is formed.

Figure 4B:
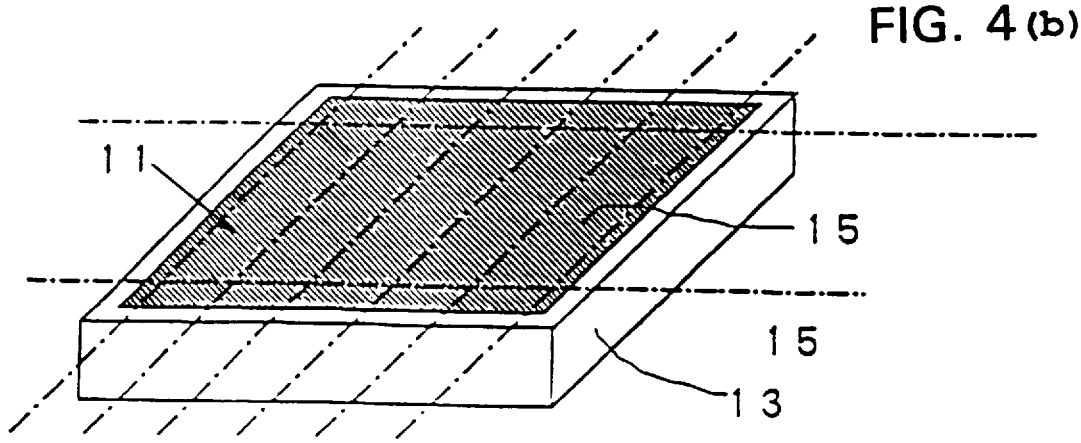

Electrodes 15 are then formed at both main surfaces of the piezoelectric substrate 13, and the piezoelectric substrate 13 is cut at portions indicated by long-and-short dotted lines in FIG. 4(b) to form a plurality of square-prism-shaped elements 11.

Figure 4C:
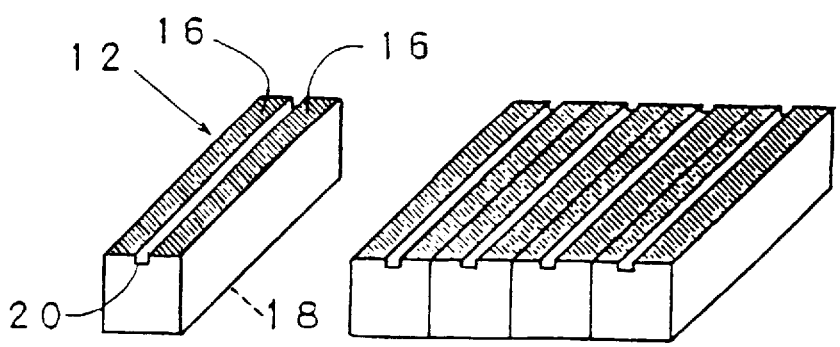

Thereafter, at the electrode 15 formed on one main surface of the element 11, as shown in FIG. 4(c), a groove 20 is formed at the center in the width direction. As a result, divided electrodes 16a and 16b, and electrode 18 consisting of a part of the electrode 15 are formed on the piezoelectric substrate 14 consisting of a part of the $LiNbO_3$ single crystal plate, whereby the vibrator 12 is mass-produced.

The support members 22 are provided with the vibrator 12 as described before, and the oscillation circuit 30, the resistors 32a, 32b, 34a, 34b, and 34c, and the differential amplifier circuit 36 are connected to obtain the vibrating gyroscope 10.

In the vibrating gyroscope 10 configured as described above, a drive signal is applied to the vibrator 12 to vibrate the piezoelectric substrate 14 under a bending mode. In this state, when the vibrating gyroscope 10 rotates about center axis O (FIG. 2) of the vibrator 12, the Coriolis force works according to its rotation angular velocity in the direction parallel to both main surfaces of the piezoelectric substrate 14 and perpendicular to center axis O of the vibrator 12. Therefore, the direction in which the vibrator 12 vibrates changes. For this reason, between the divided electrodes 16a and 16b, the signal based on the rotation angular velocity is generated.

The signal generated between the two divided electrodes 16a and 16b is detected by the differential amplifier circuit 36 through the resistors 34a and 34b.

Therefore, in this vibrating gyroscope 10, the rotation angular velocity can be obtained from the output signal of the differential amplifier circuit 36.

Figure 5:
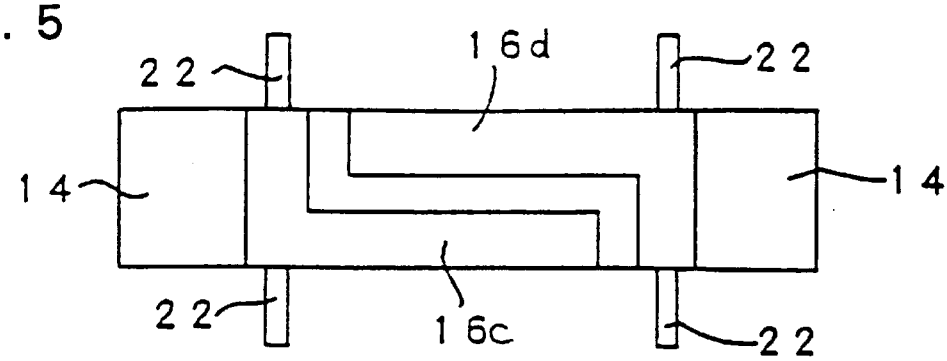
FIG. 5 is a plan showing another example of divided electrodes which are provided for a piezoelectric substrate of the vibrating gyroscope according to the present invention.

In the above-described embodiment, the divided electrodes 16a and 16b are formed in the I-shaped manner from one end to the other in the longitudinal direction of the piezoelectric substrate 14. Alternatively, divided electrodes 16c and 16d may be formed in a substantial L-shaped manner between two nodes of the piezoelectric substrate 14 such that the short axes of the two L-shaped divided electrodes 16c and 16d are aligned along the support members 22 and the long axes of the two L-shaped divided electrodes 16c and 16d oppose to each other, as shown in FIG. 5. When the divided electrodes 16c and 16d are formed between nodes of the piezoelectric substrate 14 in this way, bonding areas for leads connecting the oscillation circuit and the differential amplifier circuit to the divided electrodes are expanded, and a thin vibrator can be used.

Figure 6:
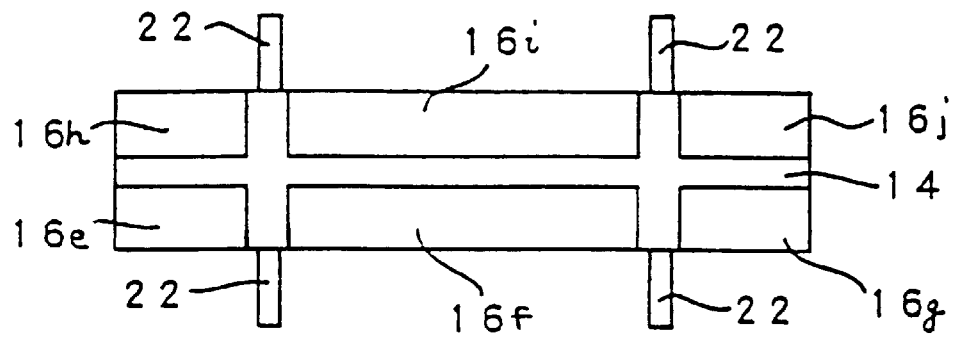
FIG. 6(a) and 6(b) are plan views showing other examples of divided electrodes provided for the piezoelectric substrate.
Figure 6:
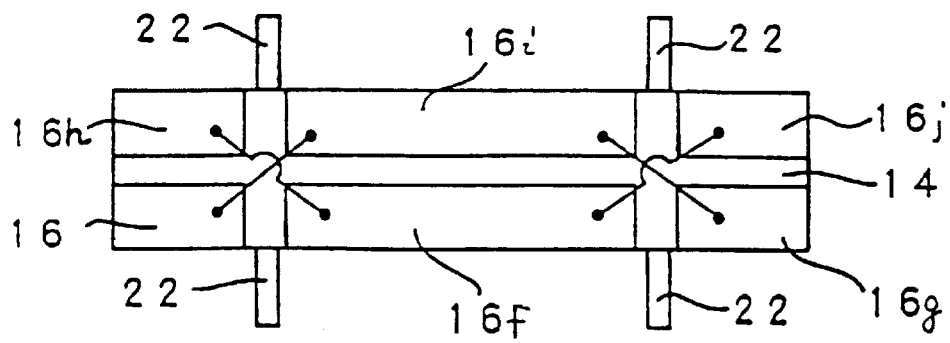

Taking it into consideration that the polarity of the generated voltage is inverted between the inside and the outside of a node, the divided electrodes formed in an I-shaped manner from one end to the other end in the longitudinal direction of the piezoelectric substrate 14 may be cut at two nodes of the piezoelectric substrate 14 to form divided electrodes 16e to 16j, as shown in FIG. 6(a). When the electrodes are configured in such a manner, efficiency in vibrating the piezoelectric substrate and efficiency in detecting the signal corresponding to a rotation angular velocity are improved. As shown in FIG. 6(b), the divided electrodes 16e to 16j may configured such that the electrodes are cut at two nodes of the piezoelectric substrate 14 and the cut portions are connected crosswise, i.e., the divided electrodes 16h, 16f, and 16j are electrically connected with each other and the divided electrodes 16e, 16i, and 16g are electrically connected with each other. When the electrodes are configured in such a manner, efficiency in vibrating the piezoelectric substrate and efficiency in detecting the signal corresponding to a rotation angular velocity are further improved.

Figure 7:
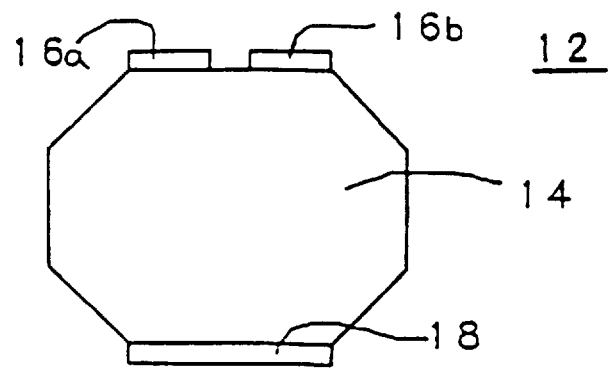
FIG. 7 is a cross section of another example of a vibrator used for a vibrating gyroscope according to the present invention.
Figure 8:
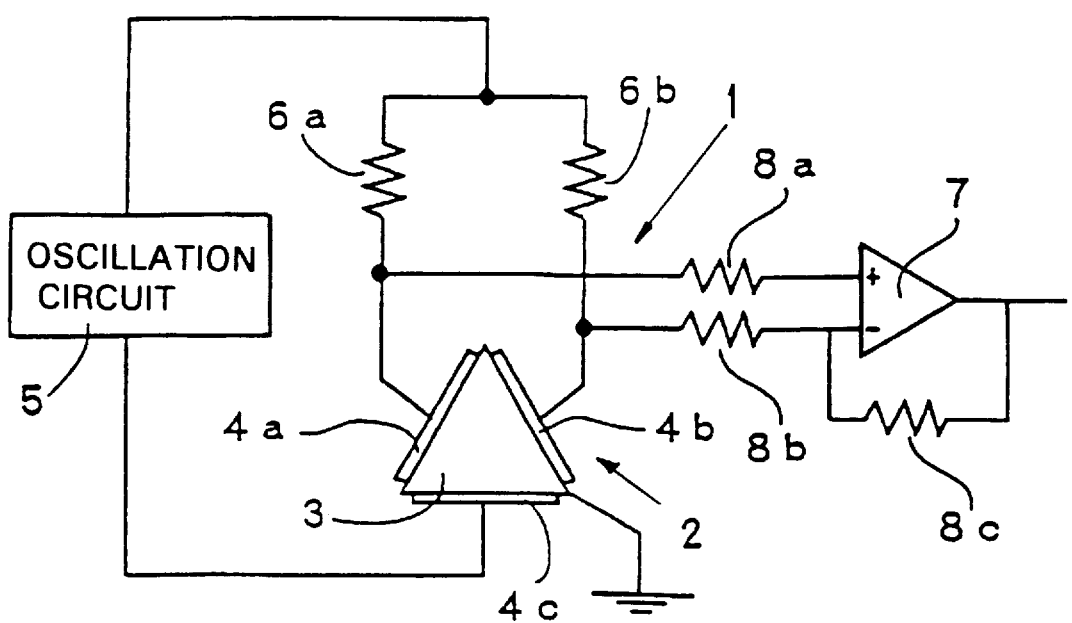
FIG. 8 is a diagram showing an example of a conventional vibrating gyroscope.

In the above embodiment, the piezoelectric substrate 14 is formed in a square-prism shape. This is because it is preferable that the piezoelectric substrate 14 has a square-prism shape so as to obtain bending vibration due to a drive signal and the Coriolis force or the signal corresponding to a rotation angular velocity most efficiently. However, the piezoelectric substrate 14 may be formed in a regular-octagonal-prism shape, as shown in FIG. 7. Alternatively, the piezoelectric substrate 14 may be formed in another shape, such as a regular-polygonal-prism shape or a cylindrical shape.

As described above, in the vibrating gyroscope according to the present invention, since expensive metal materials such as a Ni alloy are not used for the vibrator, the cost can be reduced, and the detected signal is not prone to disturbance because the signal is not susceptible to the influence of a magnetic field. In addition, since an adhesion surface does not exist between metal materials and the piezoelectric elements, and single crystal plates generating a polarization inversion phenomenon due to the pyroelectric effect, such as a $LiNbO_3$ single crystal plate and a $LiTaO_3$ single crystal plate, have high Curie points, the vibrating gyroscope has a high resistance to heat. Furthermore, a vibrating gyroscope including a vibrator having the same high Q value (Q value indicates the sharpness of resonance) as that of the conventional vibrator using a Ni alloy or the like is obtained.

Since the support members mounted in the vicinities of the nodes of the vibrator support the vibrator in a vibrating gyroscope according to the present invention, vibration is not prone to transfer from the vibrator to the outside. Accordingly, the vibrator vibrates efficiently.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A vibrating gyroscope comprising:
    a piezoelectric substrate polarized oppositely in a thickness direction, said piezoelectric substrate having first and second main surfaces, said piezoelectric substrate including a single layer having an upper portion and a lower portion, and the polarization directions of said upper and lower portions oppose each other;
    two divided electrodes provided at said first main surface of said piezoelectric substrate;
    a common electrode provided at said second main surface of said piezoelectric substrate;
    drive means for applying a drive signal between said two divided electrodes and said common electrode to vibrate said piezoelectric substrate under a bending mode; and
    detection means for detecting a signal generated between said two divided electrodes.

2. A vibrating gyroscope according to claim 1, the polarization directions of said upper and lower portions opposed each other in the vicinity of the center in the thickness direction of said piezoelectric substrate.

3. A vibrating gyroscope according to claim 2, wherein said piezoelectric substrate is a single crystal plate having a polarization inversion layer therein.

4. A vibrating gyroscope according to claim 3, wherein said single crystal plate comprises a $LiNbO_3$ single crystal plate or a $LiTaO_3$ single crystal plate.

5. A vibrating gyroscope according to claim 2, wherein the piezoelectric substrate has a square prism shape.

6. A vibrating gyroscope according to claim 2, wherein the piezoelectric substrate has an octagonal prism shape.

7. A vibrating gyroscope according to claim 2, wherein said first main surface has a longitudinal center line and the divided electrodes are located on opposite sides of said center line.

8. A vibrating gyroscope according to claim 7, wherein each of the divided electrodes is I-shaped.

9. A vibrating gyroscope according to claim 7, wherein the divided electrodes are each L shaped with respective short and long sections, with the respective long sections of the divided electrodes being located on said opposite sides of the center line.

10. A vibrating gyroscope according to claim 7, wherein the divided electrodes are further divided by transverse gaps located transversely of the longitudinal center line and in the vicinity of vibratory nodes of the substrate.

11. A vibrating gyroscope according to claim 10, wherein there are two nodes and two transverse gaps.

12. A vibrating gyroscope according to claim 11, wherein on either side of the longitudinal center line there are three electrodes, a center electrode located between respective first sides of the two transverse gaps and end electrodes located on respective second sides of the two transverse gaps.

13. A vibrating gyroscope according to claim 12, wherein each of the end electrodes is electrically connected to the center electrode on the opposite side of the center line.

* * * * *